Patented Mar. 5, 1940

2,192,864

UNITED STATES PATENT OFFICE 2,192,864

LUMINESCENT MATERIAL

Sampson Isenberg, Chicago, Ill., assignor to General Luminescent Corporation, Chicago, Ill., a corporation of Illinois No Drawing. Application June 14, 1939,
Serial No. 279,119

3 Claims. (Cl. 250—81)

My invention relates to improved luminescent materials and methods of producing the same. Its direct purpose is the production of improved luminescent materials which on excitation will show a white light.

For advertising purposes, as well as for illumination purposes, luminescent materials or combinations of luminescent materials have been utilized which have been said to produce a white light, but none of them is truly white in the sense that we use the term in making a comparison with daylight. For many purposes and in many respects, it is not essential that the light produced be a true daylight color, but it is essential, from the standpoint of the "shade" of white produced and the brilliancy of the light emitted, that the luminescent material satisfy definitely known needs in the illumination and advertising fields.

A relatively large number of materials are known which, under excitation of X-rays or the like, will emit a white or whitish light. Liebisch reported as early as 1912 (Zeitsblatt kgl. Preuss. Akad. 1912, pp. 229-40—Chemical Abstracts 6, p. 2729) that certain naturally occurring troostites, under excitation of X-rays, gave off a white color. Troostites, varieties of willemite (zinc orthosilicate) are rich in manganese. Liebisch reported that so-called white troostites contained, in addition to zinc, proportions of beryllium adequate to account for the fact that they showed a white light on excitation rather than a green light, as in the case of the better known green fluorescent willemite. A so-called synthetic troostite may be produced which emits a whitish light when exposed to X-rays and also a whitish light when coated on the inside of a neon argon mercury filled tube of the type used in illumination and advertising work. I have found that the shade of this troostite may be modified by changing the relationship of the beryllium to zinc, but that a fully satisfactory white cannot be produced. When the beryllium content is increased, the shade is too pink, that is too far toward the red end of the spectrum; and, when the beryllium content is decreased, the emitted light tends to be too green. In a tube standing out alone, this objection to the eye is not so noticeable, but, checked by instrument or placed next to other colors, the off-shade immediately is discernible. This is characteristic of some of the problems which arise with respect to the synthesizing of naturally occurring materials which luminesce to show a generally white light, but other problems relate to the efficiency or brilliancy of the light conversion and other factors which I deem it unnecessary to explain by specific example.

I have found that I am able to produce a synthetic mineral which offers marked advantages over a true synthetic troostite. I have found also that I may modify the proportions of the various constituents of my improved luminescent material to vary markedly the "shade" of white, or I may incorporate with it other luminescent materials to modify still further the shade of white, all without appreciable sacrifice of brilliancy and without the production of undesirable, pronouncedly green or pronouncedly red shades, such as have been obtained in the past. Furthermore, I may, if desired, so synthesize the material of my invention as to produce a reddish or greenish white light, but, in general, if such shades are to be brought out in a pronounced fashion, the material of my invention offers very little, if any, advantage over materials produced by merely duplicating the general structure and combination of materials found in naturally occurring troostite. While discussing this point, however, I wish to note that I employ iron as an activator, and, in the combination employed, it tends to produce a definite yellowish cast to the emitted light, and, even if the materials selected do have a tendency to accentuate either the reddish or green portion of the spectrum, the resulting color may, in general, be toned down through the proper use of iron. I am aware that in the published literature on the subject of luminescence, iron has been stated to be a substance which inhibits the luminescent phenomena or markedly cuts down brilliance, but, in the combination in which I have employed it, I have not found this condition to exist. On the contrary, I obtain much better results by its use.

The synthetic luminescent materials produced in accordance with my invention may in general be represented by the following formula:

$ZnBeSiO_4 \cdot ZnSiO_3 \cdot MnSiO_3 \cdot Fe$

Before discussing further the characteristics of the luminescent materials of my invention and the manner in which they may be produced, I wish to point out that, at the present state of the art, the chemical constitution of the material of my invention cannot be determined with absolute exactitude. The proportions of the different constituents can, of course, be determined with exactitude, but the order of their arrangement in the final composition has not been ascertained definitely. The evidence which I have obtained indicates that the system is substantially as given, and practical operations, based upon the concept that the system is as given, that is in the varying of the proportions to effect changes in shade of white, are borne out by the results obtained. The compound produced has a definite crystalline formation distinctly different from the naturally occurring troostite to which I have referred, and distinctly different from synthetic reproductions of naturally occurring troostites. It is possible that the compound is a ternary solid solution, or it may be a distinct compound which is a composite of possibly all, most, or at least several of the compounds or chemical combinations which are theoretically possible from a consideration of the materials introduced into the reaction mass. The formula or system given, however, is very advantageous for a consideration of the manner of making the compounds and the manner of modifying the proportions of the constituents to produce modified shades of white, so that those skilled in the art will be able to understand and reproduce my results. I shall, therefore, in further consideration of the luminescent materials produced in accordance with my invention, assume the system to be as given in the formula outlined above.

One example of carrying out my invention may be illustrated by giving the character X to the component ZnBeSiO$_4$; the character Y to the component ZnSiO$_3$; and the character Z to the component MnSiO$_3$. When molal proportions of Zn and Be are present in the component X, then a very desirable compound is made when X represents one hundred and twenty one parts by weight, Y one part by weight, Z seven parts by weight, and the proportion of iron, based upon the compound as a whole, and calculated as the metal, is between .01 and .001%.

*Example 1.*—In producing a system of this type, all parts being by weight, I take 18.5 parts of beryllium oxide (BeO); 61 parts of zinc oxide (ZnO); 48 parts of silicon dioxide (SiO$_2$); 10 parts of manganous chloride (MnCl$_2$·4H$_2$O) and .1 part of iron oxide (Fe$_2$O$_3$). The mixture is ball milled for approximately two hours, placed in fire clay crucibles and heated to a sintering temperature for a sufficient length of time to complete the reaction among the constituents. A suitable procedure is to heat the mixture of starting ingredients at about 1150 degrees C. for four to six hours. Very desirable results are also obtained at somewhat lower temperatures, but the heating time must be increased somewhat when the temperature is lowered.

The sintered mass produced in accordance with the above example is broken up and sifted to a desired particle size, for example, two hundred mesh. When this material is coated on tubes filled with a neon-argon-mercury mixture, following the procedure disclosed in the copending application of Isenberg and Hultgren, Serial No. 263,412, filed March 22, 1939, the coating, on excitation, produces a pleasing white light with a yellowish tinge, very desirable in the advertising field and for illumination purposes.

The system referred to hereinabove may be modified in several respects and, in order to bring out clearly the modifications, I repeat below a general formula representing the system with the symbols $x$, $y$ and $z$ inserted to identify different components of the system.

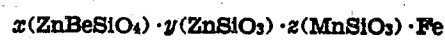

$x$(ZnBeSiO$_4$)·$y$(ZnSiO$_3$)·$z$(MnSiO$_3$)·Fe

The manner in which the system can be modified is readily explainable by reference to the above formula. The $x$ constituent preferably comprises approximately 121 parts by weight, the $y$ constituent one part by weight, and the $z$ constituent 7 parts by weight, with the iron comprising 0.01% to 0.001% of the whole. This relationship is subject to considerable variation, however. Assuming the remaining constituents to be as set forth in Example 1, the preferred relationship between zinc and beryllium in the $x$ component is one to one, that is, equal molal proportions of Zn and Be may be present in the preferred system. However, this relationship may be changed from 0.5 to 1.5 mols of either beryllium or zinc, preferably without major change in the $y$ and $z$ components. If the system as a whole is changed, however, for example, if the manganese should be increased markedly, the proportion of beryllium may be decreased quite markedly.

The components $y$ and $z$ are shown as the metasilicate, and calculations of proportions based on the formation of the metasilicate are suitable in determining the result to be produced, although it is possible that the orthodisilicate may be present in place of these two components. The amount of manganese employed in the system is conveniently calculated on MnSiO$_3$ content as compared to ZnSiO$_3$ content. I find that the effect produced in the final product, when the relationship of $y$ to $z$ is changed, is a curve, the mid point of which represents the optimum result for most purposes, and this midpoint coincides with the preferred range given in which the $y$ constituent is one and the $z$ constituent is seven. The proportions may be varied, however, between approximately 3½ to 14, that is to say, the $z$ constituent may be three and one-half times the $y$ constituent to fourteen times the $y$ constituent, and very good results produced. This relationship assures that the $x$ component and the general relationship of $x$ to $y$ and $z$ remains unchanged, since with a modification of the relationship, the manganese may be increased markedly, as will be shown in a subsequent example. In connection with this same relationship, if manganese is calculated as the metal in the compound as a whole, the proportion of manganese may range from about 1% to about 5% with the preferred range approximately 2% to 2½%, and the peak results at about 2.3% when the compound is otherwise unchanged over that given above as preferred.

The $y$ and $z$ components may also become modified or may be modified when the relationship of either zinc or manganese, or both, to silicon is changed. I have already pointed out that the silicon, introduced preferably as either silicon dioxide or silicic acid, is preferably in excess of that required to produce the $x$ component. Varying this excess is illustrative of one kind of modification which will result in changing the relationship of either or both the zinc and manganese to silicon in the $y$ and $z$ constituents.

It will be seen that there are several relationships to consider, indeed I have already pointed out modifications which result in changing some nine relationships in the system, and changing any of them results in a modification of the results produced, determinable by tests of the final product, and, within the ranges which I describe, adequate brilliancy is obtained, the principal effect being modification of the shade of white light produced.

For the benefit of those skilled in the art, I wish to point out the manner in which changing some of the constituents referred to will affect the white "shade" of the final product.

Considering the $x$ constituent alone, increasing the beryllium content tends to shift the emitted light toward the red end of the spectrum while increasing the zinc causes a slight predominance of green. From the standpoint of changes in the $y$ and $z$ constituents, increasing the manganese causes a shift toward the red end of the spectrum, while decreasing the manganese produces less red color, making the final product show either a slight pink or a slight green, depending upon other factors. When the amount of $SiO_2$ is in excess of that required to produce the $y$ and $z$ constituents, there is less red in the final product, the compound being richer in blue rays as the $SiO_2$ content is increased within the range discussed.

Whatever may be the specific proportions of the remaining constituents, iron, at all times within the ranges given, introduces a yellowish tinge and results in the production of a very desirable white light. Some of these color relationships will be made clearer from a consideration of further specific examples.

*Example 2.*—11.5 parts of BeO; 130 parts of ZnO; 61 parts of $SiO_2$; 10 parts of manganese chloride; 0.33 part zinc permanganate, and .01 part of $Fe_2O_3$ are ball milled together, heated, powdered, and introduced into a tube, following the time, temperature and coating conditions given in the first example. The light emitted may be compared with the light emitted from the product of Example 1 by reference to the color to the eye of the emitted light. The product of Example 1 is almost a true white light, but showing a slightly yellowish tinge to the eye. It does not appear either pink or green and, under substantially all conditions, holds its shade; that is to say, it is not affected adversely by change in temperature and its substantially true white color is clear from the fact that, when it is placed next to other tubes of different color, it does not show either red or green in contrast, as do some other so-called white lights produced in accordance with the methods of the prior art. Example 2 differs from Example 1 in that it produces a colder color, almost snow colored. It has much less yellow than Example 1 and, without the iron, would appear slightly green to the eye.

*Example 3.*—By the use of suitable starting materials, the exact proportions depending upon whether or not the oxides are used or substances which may be fired to the oxides, a product is made up in accordance with the following formula:

$X(Zn_{0.75}Be_{1.25}SiO_4) \cdot Z(MnSiO_3) \cdot Fe$ wherein the X component comprises 94 parts and the Z component six parts, and iron .001% of the compound as a whole. It will be noted that the relationship of Zn to Be in the X component is as three to five (the subscripts indicating total moles present) and also that the $y$ component shown in Example 1 is not present. The product produced in accordance with this example may be heated and otherwise treated, as explained in Example 1, and either coated alone or in combination with another fluorescent material, as will be described, onto the inside of the neon-argon-mercury tube in accordance with the method described in the copending application referred to. The substance produced by this example produces a light, when excited, which is a warm yellowish pink, showing to the eye as white except when associated with other light which, by contrast, will bring out the yellowish pinkish shade.

*Example 4.*—The following materials are weighed out in the amounts given, and mixed together:

| | |
|---|---|
| ZnO | 7 lbs. 3 oz. |
| $H_2SiO_3$ | 3 lbs. 13 oz. |
| $MnCl_2 \cdot 4H_2O$ | 1 lb. |
| BeO | 66.3 grams |
| $Zn(MnO_4)_2$ | 10 grams |
| $Fe_2O_3$ | 1 gram |

This mixture, ball milled and then introduced into a suitable crucible, is heated for four to six hours at 1150 degrees C. to 1200 degrees C. After cooling, it is sifted to proper particle size, and is then ready for application to a tube, such as one filled with a conventional neon-argon-mercury mixture.

This material, on activation, emits a white light of a very desirable ivory shade. The light efficiency is very high for a white light, approaching in efficiency the green emissions of synthetic willemite.

The material of this Example 4 may be produced without iron, but the presence of iron is desirable, its inclusion appearing to help the color, and contributing to the property of maintaining the ivory shade even at very low winter temperatures.

The amount of beryllium used in this preparation, as seen from the proportions used, is about 0.5%, i. e., about the order of magnitude of an activator. The percentage of manganese is considerably greater than the percentage of beryllium. We may consider that we have present a mixture or solid solution of zinc silicate and manganese silicate activated with beryllium and iron.

Following the style of formula employed in describing the preceding examples, the product of this Example 4 may be represented by the formula:

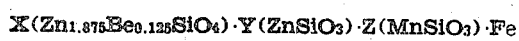

$X(Zn_{1.875}Be_{0.125}SiO_4) \cdot Y(ZnSiO_3) \cdot Z(MnSiO_3) \cdot Fe$ wherein the subscripts in the X portion indicate molal relations. When the beryllium content is decreased to the extent obtaining in this example, it is questionable whether it is present in the X component—i. e., it is very improbable that there is any zinc-beryllium silicate component present at all.

The material of this example, however, possibly may be more appropriately represented as follows:

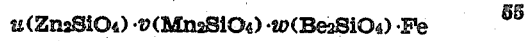

$u(Zn_2SiO_4) \cdot v(Mn_2SiO_4) \cdot w(Be_2SiO_4) \cdot Fe$

The $u$ constituent may be an orthosilicate, or a mixture of ortho and metasilicate. We may have the orthosilicates $Mn_bZn_aSiO_4$ and $Zn_aBe_bSiO_4$, (where $a$ is greater than $b$) or either combination made possible by the quantities of elements present. In any event, the formula given is adequate to illustrate the invention and show the manner in which the results may be duplicated or modified, within the scope of the invention.

The white light which I produce in accordance with my invention may be further modified as to shade by combining with the substances of the preceding examples, or other luminescent materials made in accordance with the specification, another luminescent material, preferably one having the ability to emit light in the blue to green portion of the spectrum. There are several luminescent materials which may be utilized in this manner, one with which very good results are obtained being magnesium tungstate activated with lead. This material may be prepared by heating a mixture of tungstic acid (H₂WO₄·2H₂O)

one mole, with magnesium oxide (MgO), one mole plus about 1%, and lead chloride (PbCl₂) as an activator, at approximately 1000 degrees C. for about one half hour. The lead content, calculated as the metal, may be about one percent of the final compound. Molal proportions of tungstic acid and magnesium oxide may be used, but better results are obtained if a slight excess of magnesium oxide is present.

Example 5.—A very desirable white light is obtained by mixing together 40 parts of the white light material of Example 1 and 12 parts of magnesium tungstate made in accordance with the preceding description. This mixture produces a light of substantially sunlight color when suitably introduced into a mercury-neon-argon tube and excited by passing voltage through the tube.

Example 6.—40 parts of the white light material produced in accordance with Example 1 and 36 parts of magnesium tungstate are combined and the mixture coated in a suitable manner on the inside of a tube. The light produced on excitation is a very desirable shade of daylight, not quite so yellow, however, as the sunlight shade produced in accordance with Example 5.

Example 7.—10 parts of the material produced in accordance with Example 3 are mixed together with 6 parts of magnesium tungstate and, when this mixture is coated on the inside of a tube, a very desirable shade of white for interior illumination is produced.

In producing the mixtures described in connection with Examples 5, 6 and 7, the two luminescent materials which go into the mixture are, of course, separately produced.

The last three examples given are merely illustrative of additional substances that may be employed with the novel luminescent materials of my invention, as disclosed, for instance, in Examples 1 to 5, inclusive. In place of magnesium tungstate, I may also employ such substances as calcium tungstate activated with lead, zinc phosphate (Zn₃(PO₄)₂) activated with a suitable material such as manganese or bismuth, or calcium molybdate either activated with a separate material or with no added activator. Of these materials, calcium tungstate, when excited, produces a bluish light, the zinc phosphate is somewhat greenish, and the calcium molybdate is a whitish blue. The exact proportions of materials of this or other types which are employed will depend upon the final shade desired.

Thus it will be seen that by means of my invention I produce white light by the use of several different specific systems, all following the same concept, or by combinations with a substance produced in accordance with this concept of another substance which exhibits when excited a bluish to greenish color. In this way, I may obtain a relatively large number of shades of white, all having advantages in the fields in which luminescent materials may be used. The detailed descriptions and examples are adequately illustrative of modifications that are employable but are not meant to limit the invention as defined in the claims.

What I claim as new and desire to protect by Letters Patent of the United States is:

1. A luminescent material effective, upon excitation, to produce a "white" light, said material being represented by the following general empirical system (X)ZnBeSiO₄·(Y)ZnSiO₃·(Z)MnSiO₃·Fe wherein the relationship of the components is of the order of X, 121; Y, 1; Z, 7 (the numerals indicating parts by weight); and Fe, .01 to .001% of the system as a whole, and where the molal relationship of Zn to Be in the X component is about 1 to 1.

2. A luminescent material as defined in claim 1, wherein the relationship of Z to Y is from 3½ to 1 to 14 to 1, the numerals indicating parts by weight.

3. A luminescent material effective, upon excitation, to produce a "white" light, said material comprising a sintered mixture of compounds of zinc, silicon, beryllium and manganese in proportions to produce a system including zinc beryllium orthosilicate, zinc metasilicate, and manganese metasilicate, wherein the proportion of manganese metasilicate to zinc beryllium orthosilicate, calculated by weight, is of the order of 7 to 121, and wherein the zinc metasilicate comprises about one-seventh by weight of the manganese metasilicate.

SAMPSON ISENBERG.